United States Patent
Shibata (10) Patent No.: US 9,942,759 B2
(45) Date of Patent: Apr. 10, 2018

(54) COMMUNICATION APPARATUS

(71) Applicant: Brother Kogyo Kabushiki Kaisha, Nagoya-shi, Aichi-ken (JP)

(72) Inventor: Hiroshi Shibata, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 91 days.

(21) Appl. No.: 15/198,612

(22) Filed: Jun. 30, 2016

(65) Prior Publication Data

US 2017/0005876 A1    Jan. 5, 2017

(30) Foreign Application Priority Data

Jul. 3, 2015    (JP) ................................. 2015-134027

(51) Int. Cl.
*H04W 4/00*    (2009.01)
*H04W 12/06*    (2009.01)
(Continued)

(52) U.S. Cl.
CPC ........... *H04W 12/06* (2013.01); *H04W 12/08* (2013.01); *H04W 48/20* (2013.01);
(Continued)

(58) Field of Classification Search
CPC ..... H04W 12/06; H04W 48/20; H04W 12/08; H04W 48/12; H04W 88/08; H04W 84/12; H04L 41/0803
See application file for complete search history.

(56) References Cited

U.S. PATENT DOCUMENTS 7,359,339 B2 * 4/2008 Benson ............... H04L 41/0816
                                                              370/244
8,457,085 B2 * 6/2013 Izaki ....................... H04W 8/20
                                                              370/338
(Continued)

FOREIGN PATENT DOCUMENTS

| JP | 2005-184844 A | 7/2005 |
| JP | 2009-044701 A | 2/2009 |
| JP | 2013-115687 A | 6/2013 |

OTHER PUBLICATIONS

Sep. 29, 2016—(US) Co-pending U.S. Appl. No. 15/279,643.
(Continued)

*Primary Examiner* — Robert Wilson
(74) *Attorney, Agent, or Firm* — Banner & Witcoff, Ltd.

(57) ABSTRACT

A communication apparatus may receive a first specific signal including a specific wireless identifier from an external apparatus; determine whether the specific wireless identifier is a first wireless identifier; in a case where it is determined that the specific wireless identifier is the first wireless identifier, shift an operating state of the communication apparatus to one state of a first parent state and a child state, and form the first wireless network to which both the communication apparatus and the external apparatus belong. In a case where it is determined that the specific wireless identifier is not the first wireless identifier, the communication apparatus is maintained in a first non-belonging state. The communication apparatus may receive specific wireless setting information from the external apparatus by using the first wireless network; and belong to the specific wireless network by using the specific wireless setting information.

14 Claims, 6 Drawing Sheets

(51) Int. Cl.
*H04W 12/08* (2009.01)
*H04W 48/20* (2009.01)
*H04W 88/08* (2009.01)
*H04W 84/12* (2009.01)
*H04L 12/24* (2006.01)
*H04W 48/12* (2009.01)

(52) U.S. Cl.
CPC ......... *H04L 41/0803* (2013.01); *H04W 48/12* (2013.01); *H04W 84/12* (2013.01); *H04W 88/08* (2013.01)

(56) References Cited

U.S. PATENT DOCUMENTS

| | | | | |
|---|---|---|---|---|
| 9,603,114 | B2* | 3/2017 | Tanaka | H04W 60/00 |
| 9,781,765 | B2* | 10/2017 | Nogawa | H04W 76/028 |
| 2005/0135236 | A1 | 6/2005 | Benson et al. | |
| 2008/0316949 | A1* | 12/2008 | Yamamoto | H04B 7/0608 |
| | | | | 370/311 |
| 2009/0046686 | A1 | 2/2009 | Izaki | |
| 2012/0320401 | A1* | 12/2012 | Shibata | H04L 63/083 |
| | | | | 358/1.14 |
| 2012/0320414 | A1* | 12/2012 | Shibata | H04W 8/005 |
| | | | | 358/1.15 |
| 2013/0137414 | A1* | 5/2013 | Matsuda | H04W 8/005 |
| | | | | 455/418 |
| 2013/0196702 | A1* | 8/2013 | Shibata | H04W 76/02 |
| | | | | 455/509 |
| 2013/0260683 | A1* | 10/2013 | Suzuki | H04W 4/008 |
| | | | | 455/41.1 |
| 2014/0071974 | A1* | 3/2014 | Watari | H04L 9/0866 |
| | | | | 370/338 |
| 2014/0287682 | A1* | 9/2014 | Minemura | H04W 4/008 |
| | | | | 455/41.1 |
| 2014/0362841 | A1* | 12/2014 | Shibata | H04W 48/18 |
| | | | | 370/338 |
| 2016/0192429 | A1* | 6/2016 | Nogawa | H04W 8/005 |
| | | | | 370/329 |
| 2017/0005876 | A1* | 1/2017 | Shibata | H04W 12/06 |
| 2017/0048103 | A1* | 2/2017 | Azuma | H04L 12/6418 |
| 2017/0094451 | A1* | 3/2017 | Terashita | H04W 4/008 |
| 2017/0265244 | A1* | 9/2017 | Nogawa | H04W 76/027 |

OTHER PUBLICATIONS

Wi-Fi Alliance Technical Committee P2P Task Group, "Wi-Fi Peer-to-Peer (P2P) Technical Specification", Version 1.1, pp. 1-159, 2010.

* cited by examiner

FIG. 1

FIG. 4
(Second Embodiment)

COMMUNICATION APPARATUS

CROSS-REFERENCE TO RELATED APPLICATION

This application claims priority to Japanese Patent Application No. 2015434027, filed on Jul. 3, 2015, the entire contents of which are hereby incorporated by reference into the present application.

TECHNICAL FIELD

The present specification discloses a technique for a communication apparatus to form a wireless network.

DESCRIPTION OF RELATED ART

Various techniques for a communication apparatus to form a wireless network are known. For example, a communication apparatus supporting a so-called SoftAP function can activate a SoftAP and operate as a parent station of a wireless network. In this case, when another apparatus operates as a child station of the wireless network, both the communication apparatus and the other apparatus can belong to the wireless network. In addition, a communication apparatus supporting the WED (an abbreviation of Wi-Fi Direct (registered trademark)) scheme formulated by the Wi-Fi. Alliance can shift to a G/O (an abbreviation of Group Owner) state in accordance with the WFD scheme and operate as a parent station of a wireless network. In this case, when another apparatus operates as a child station of the wireless network (for example, in a Client state in accordance with the WED scheme), both the communication apparatus and the other apparatus can belong to the wireless network.

SUMMARY

A communication apparatus can operate as a parent station (for example, a SoftAP or a G/O apparatus in accordance with the WED scheme described above) or a child station in response to, for example, receiving a wireless connection request from another apparatus and can belong to a wireless network. However, since a communication apparatus is incapable of appropriately determining a network to which the communication apparatus should belong, the communication apparatus may end up belonging to a wireless network not desired by a user. When the communication apparatus belongs to the wireless network not desired by the user, a processing load on the communication apparatus may unnecessarily increase. The present specification provides a technique capable of preventing a processing load on a communication apparatus from increasing unnecessarily by causing the communication apparatus to appropriately determine a wireless network, to which the communication apparatus should belong.

A communication apparatus disclosed in the present specification may comprise: a processor; and a memory storing a specific character string and computer-readable instructions therein, the computer-readable instructions, when executed by the processor, causing the communication apparatus to perform: receiving a first specific signal including a specific wireless identifier from an external apparatus; determining whether the specific wireless identifier in the first specific signal is a first wireless identifier including the specific character string in the memory, the first wireless identifier being for identifying a first wireless network; in a case where it is determined that the specific wireless identifier is the first wireless identifier, shifting an operating state of the communication apparatus from a first non-belonging state in which the communication apparatus does not belong to the first wireless network to a first parent state in which the communication apparatus operates as a parent station of the first wireless network; and forming the first wireless network to which both the communication, apparatus being the parent station and the external apparatus being a child station belong after the operating state of the communication apparatus is shifted to the first parent state, wherein in a case where it is determined that the specific wireless identifier is not the first wireless identifier, the communication apparatus is maintained in the first non-belonging state.

A communication apparatus disclosed in the present specification may comprise: a processor; and a memory storing a specific character string and computer-readable instructions therein, the computer-readable instructions, when executed by the processor, causing the communication apparatus to perform: receiving a first specific signal including a specific wireless identifier from an external apparatus; determining whether the specific wireless identifier in the first specific signal is a first wireless identifier including the specific character string in the memory, the first wireless identifier being for identifying a first wireless network; in a case where it is determined that the specific wireless identifier is the first wireless identifier, shifting an operating state of the communication apparatus from a first non-belonging state in which the communication apparatus does not belong to the first wireless network to one state of a first parent state in which the communication apparatus operates as a parent station of the first wireless network and a child state in which the communication apparatus operates as a child station of the first wireless network; forming the first wireless network to which both the communication apparatus being the parent station or the child station and the external apparatus being the child station or the parent station belong after the operating state of the communication apparatus is shifted to either of the first parent state or the child state, wherein in a case where it is determined that the specific wireless identifier is not the first wireless identifier, the communication apparatus is maintained in the first non-belonging state; receiving specific wireless setting information from the external apparatus by using the first wireless network in a case where the first wireless network is formed, the specific wireless setting information being currently used in a specific wireless network formed by a specific access point, the external apparatus satisfying either one condition of currently belonging to the specific wireless network and having previously belonged to the specific wireless network; and belonging to the specific wireless network by using the specific wireless setting information in a case where the specific wireless setting information is received from the external apparatus.

A control method and a computer program for realizing such a communication apparatus and a computer-readable storage medium that stores the computer program are also novel and useful. In addition, a communication system including the communication apparatus and the external apparatus described above is also novel and useful.

EMBODIMENTS

Figure 1:
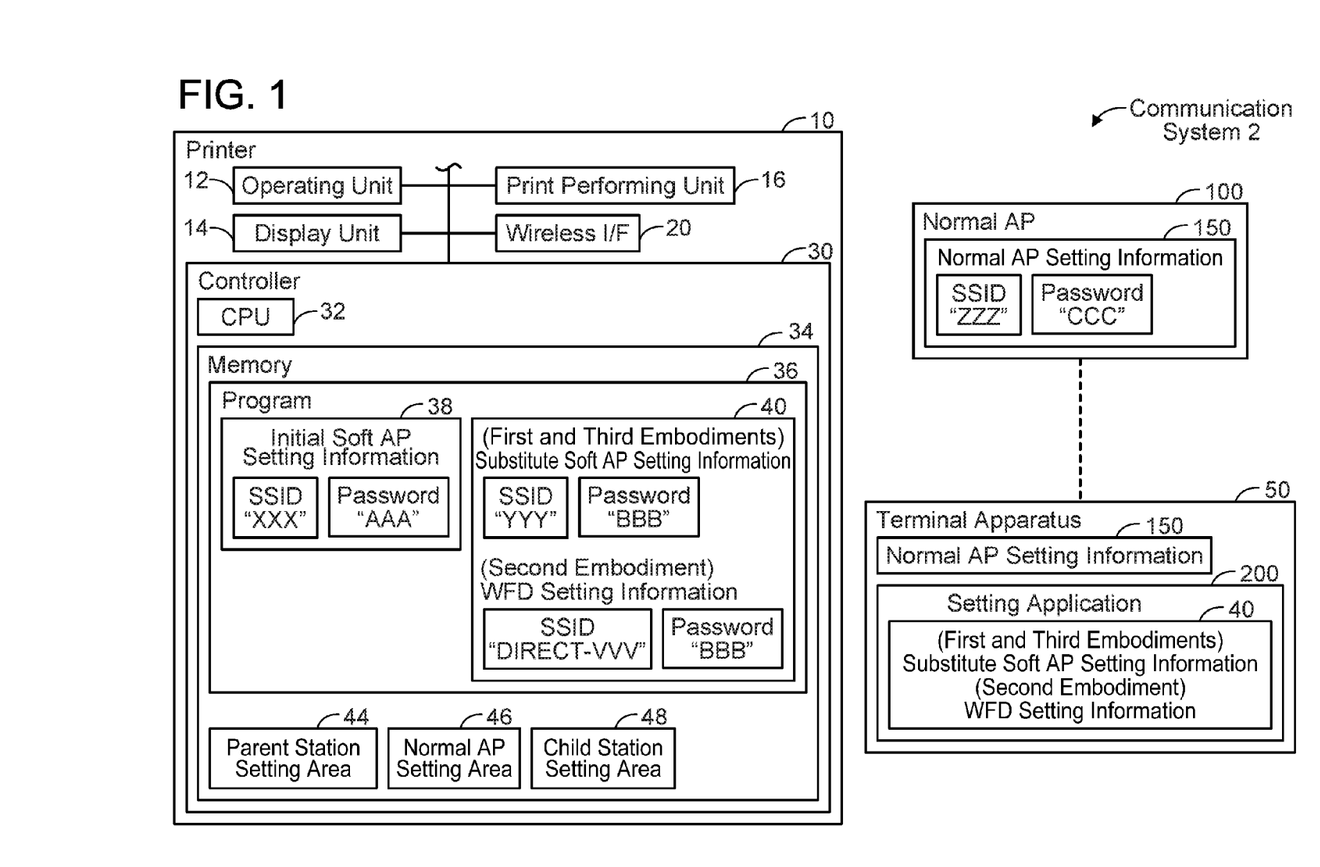
FIG. 1 shows a configuration of a communication system.

First Embodiment (Configuration of Communication System 2; FIG. 1)

The communication system 2 comprises a printer 10, a terminal apparatus 50, and a normal access point 100. Hereinafter, the normal access point 100 will be referred to as a "normal AP" 100.

(Configuration of Printer 10)

The printer 10 is a peripheral apparatus capable of performing a printing function (that is, a peripheral apparatus such as the terminal apparatus 50). The printer 10 includes an operating unit 12, a display unit 14, a print performing unit 16, a wireless interface 20, and a controller 30. Hereinafter, an interface will be abbreviated as an "I/F".

The operating unit 12 comprises a plurality of keys. By operating the operating unit 12, the user can input various instructions to the printer 10. The display unit 14 is a display for displaying various types of information. The print performing unit 16 comprises a printing mechanism such as an inkjet system, a laser system, or the like.

The wireless I/F 20 is an I/F for performing wireless communication in accordance with the Institute of Electrical and Electronics Engineers, Inc. (IEEE) 802.11. Specifically, the wireless I/F 20 can establish a wireless connection with the normal AP 100 (hereinafter, referred to as a "normal AP connection") in accordance with IEEE 802.11 and, as a result, the printer 10 can join, as a child station, a wireless network in which the normal AP 100 operates as a parent station (hereinafter, referred to as a "normal APNW" (an abbreviation of normal AP network)). In addition, the printer 10 can perform wireless communication with other apparatus(es) belonging to the normal APNW (for example, the terminal apparatus 50) via the normal AP 100.

The wireless I/F 20 particularly supports a SoftAP (an abbreviation of software access point) function in the IEEE 802.11. When the SoftAP of the wireless I/F 20 is activated, the printer 10 operates as an AP (that is, a parent station) of a wireless network and is able to establish a wireless connection (hereinafter, referred to as a "SoftAP connection") with another apparatus (for example, the terminal apparatus 50). That is, the other apparatus(es) can join, as a child station, a wireless network (hereinafter, referred to as a "SoftAPNW" (an abbreviation of a SoftAP Network)) in which the printer 10 operates as a parent station.

Physically, the wireless I/F 20 is a single interface. However, a first MAC address for establishing a normal AP connection and a second MAC address for establishing a SoftAP connection (that is a MAC address that differs from the first MAC address) are assigned to the wireless 20. Therefore, the printer 10 is capable of simultaneously performing both wireless communication using the normal AP connection and wireless communication using the SoftAP connection via the wireless I/F 20. Moreover, in a modification, an interface for performing wireless communication using the normal AP connection and an interface for performing wireless communication using the SoftAP connection may be respectively configured by chips that physically differ from each other.

The controller 30 comprises a CPU 32 and a memory 34. The CPU 32 is a processor that performs various processes in accordance with a program 36 stored in the memory 34. The memory 34 is configured by a RAM, a ROM, or the like. The program 36 includes initial SoftAP setting information 38 and alternative SoftAP setting information 40.

The initial SoftAP setting information 38 is information used in a SoftAPNW formed by a SoftAP (hereinafter, referred to as an "initial SoftAP") that is activated at a timing where power of the printer 10 is turned on. The initial SoftAP setting information 38 is information provided to a vendor of the printer 10 in advance by a specific business operator which differs from the vendor. The initial SoftAP setting information 38 includes an SSID (an abbreviation of a service set identifier) "XXX", a password "AAA", and the like.

The alternative SoftAP setting information 40 is information used in a SoftAPNW formed by a SoftAP (hereinafter, referred to as an "alternative SoftAP") that is activated at a different timing from the timing where power of the printer 10 is turned on. The alternative SoftAP setting information 40 is information determined in advance by the vendor of the printer 10 and differs from the initial SoftAP setting information 38. The alternative SoftAP setting information 40 includes an SSID "YYY", a password "BBB", and the like. Hereinafter, the SoftAPNW in which the initial SoftAP setting information 38 is used and the SoftAPNW in which the alternative SoftAP setting information 40 is used will be respectively referred to as an "initial SoftAPNW" and an "alternative SoftAPNW".

The memory 34 comprises a parent station setting area 44 and a normal AP setting area 46. The parent station setting area 44 is an area in which, in a state where the printer 10 operates as a parent station of a SoftAPNW, wireless setting information used in the SoftAPNW (that is, the initial SoftAP setting information 38 or the alternative SoftAP setting information 40) is stored. The normal AP setting area 46 is an area in which, in a state where the printer 10 operates as a child station of a normal APNW, wireless setting information used in the normal APNW (that is, an SSID, a password, and the like; hereinafter, referred to as "normal AP setting information") is stored.

(Configuration of Normal AP 100)

The normal AP 100 is a known AP that is referred to as a wireless AP, a wireless LAN muter, or the like, and differs from the SoftAP. The normal AP 100 relays communication between a pair of apparatuses for which a normal AP connection with the normal AP 100 has been established or, that is, communication between the pair of child stations of the normal APNW (for example, the printer 10 and the terminal apparatus 50). The normal AP 100 stores normal AP setting information 150 currently used in the normal APNW. The normal AP setting information 150 includes an SSID "ZZZ" and a password "CCC".

(Configuration of Terminal Apparatus 50)

The terminal apparatus 50 is, for example, a portable terminal such as a mobile phone, a smart phone, a notebook PC, or a tablet PC. The terminal apparatus 50 can join the normal APNW or a SoftAPNW as a child station. The terminal apparatus 50 stores the normal AP setting information 150 in a case where the terminal apparatus 50 currently belongs to the normal APNW or in a case where the terminal apparatus 50 has previously belonged to the normal APNW. The terminal apparatus 50 also stores an application program (hereinafter, referred to as a "setting application") 200 for setting the normal AP setting information 150 to the printer 10. The setting application 200 is a program provided by the vendor of the printer 10 and includes information 40 which matches the alternative SoftAP setting information 40 stored in the printer 10 in advance.

Figure 2:
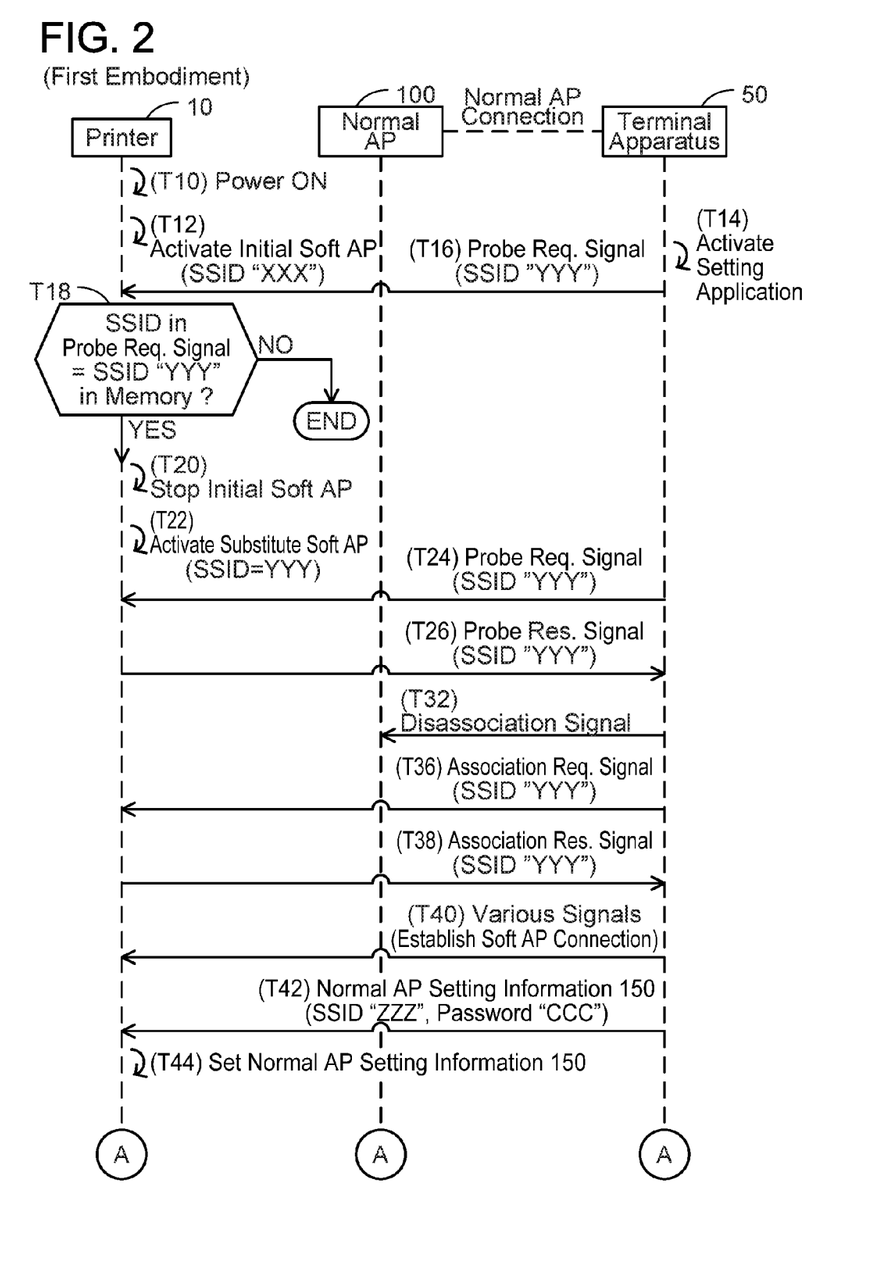
FIG. 2 is a sequence diagram of a first embodiment in which a printer operates as a SoftAP.
Figure 3:
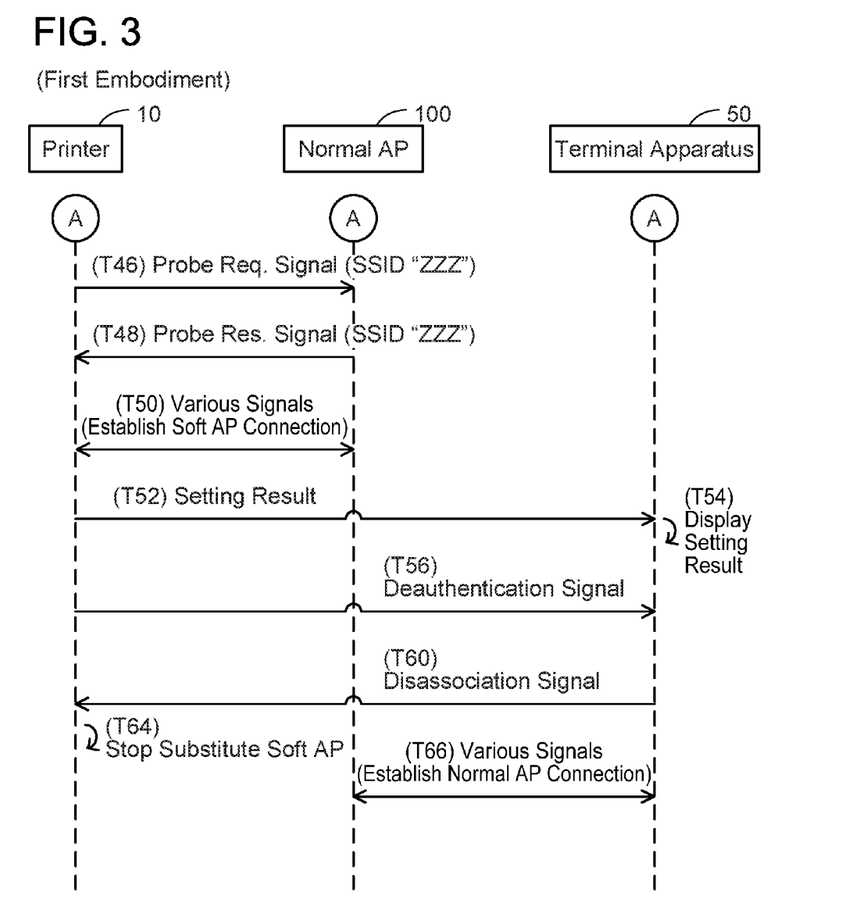
FIG. 3 is a sequence diagram that is a continuation of FIG. 2.

(Processes of Respective Devices 10, 50, 100, and the Like: FIGS. 2 and 3)

Next, contents of the respective processes performed by the printer 10 and the like will be described with reference to FIGS. 2 and 3. In an initial state shown in FIG. 2, the terminal apparatus 50 has established a normal AP connection with the normal AP 100 and belongs to a normal APNW. In T10, the user toms on power of the printer 10. Hereinafter, when describing processes performed by the CRT 32 of the printer 10, an expression "the printer 10 performs . . . " will be used in place of an expression "the CPU 32 of the printer 10 performs . . . ".

In T12, the printer 10 activates the initial SoftAP using the initial SoftAP setting information 38. Specifically, the printer 10 stores the initial SoftAP setting information 38 included in the program 36 in the parent station setting area 44. Accordingly, an operating state of the printer 10 shifts from a state where the printer 10 does not belong to the initial SoftAPNW to a parent state where the printer 10 operates as a parent station of the initial SoftAPNW.

A reason for adopting a configuration in which the initial SoftAP is activated when power of the printer 10 is turned on (hereinafter, referred to as a "specific configuration") will now be described. First, the reason for activating the initial SoftAP is as follows. In the initial SoftAPNW that is formed in accordance with the initial SoftAP, the initial SoftAP setting information 38 that is setting information having an authentication scheme and a coding scheme of relatively low security levels is used. Accordingly, the user can have various apparatuses join the initial SoftAPNW as child stations without having to perform complicated wireless settings. In this case, the printer 10 can perform wireless communication with the various apparatuses using the initial SoftAPNW. In this manner, the printer 10 activates the initial SoftAP in order to enable communication with various apparatuses to be performed.

In addition, a reason why the initial SoftAP is activated when turning on power is as follows. Supposing that the initial SoftAP is not activated when turning on power, the user must perform an operation for activating the initial SoftAP after power has been turned on. On the other hand, in the case where the initial. SoftAP is activated when turning on power, since the user may not need to separately perform an operation for turning on power and an operation for activating the initial SoftAP, convenience is improved. The specific configuration is adopted due to the two reasons described above.

In a case where the user of the terminal apparatus 50 desires to have the printer 10 also belong to the normal APNW to which the terminal apparatus 50 belongs, in T14, the user performs an operation for activating the setting application 200 on the terminal apparatus 50. Accordingly, the terminal apparatus 50 activates the setting application 200 and, in T16, reads the SSID "YYY" included in the alternative SoftAP setting information 40 in the setting application 200, and transmits a Probe Request signal including the SSID "YYY" to the printer 10. Hereinafter, Request and Response will be respectively written as "Req." and "Res.".

In a case where the printer 10 receives the Probe Req. signal including the SSID "YYY" from the terminal apparatus 50, in T18, the printer 10 determines whether or not the SSID "YYY" in the Probe Req. signal matches the SSID "YYY" included in the alternative SoftAP setting information 40 in the memory 34. In a case where the SSID "YYY" in the Probe Req. signal matches the SSID "YYY" in the memory 34 (YES in T18), the printer 10 proceeds to T20.

On the other hand, for example, in a case where the user desires that the terminal apparatus 50 establish a wireless connection with an AP other than the normal AP 100, the operation for activating the setting application 200 is not performed on the terminal apparatus 50 but an operation for establishing the wireless connection with an AP other than the normal AP 100 is performed on the terminal apparatus 50. In this case, the printer 10 may receive a Probe Req. signal that does not include the SSID "YYY" from the terminal apparatus 50. In such a state, the printer 10 determines that the SSID in the Probe Req. signal does not match the SSID "YYY" in the memory 34 (NO in T18) and ends the processing shown in FIG. 2 without performing the processes of T20 and thereafter. In this case, the operating state of the printer 10 is maintained in a state where the printer 10 does not belong to the alternative SoftAPNW identified by the SSID "YYY".

In T20, the printer 10 stops the initial SoftAP. Specifically, the printer 10 erases the initial SoftAP setting information 38 in the parent station setting area 44. Accordingly, the printer 10 causes the initial SoftAPNW to disappear. The operating state of the printer 10 shifts from a parent state where the printer 10 operates as the parent station of the initial SoftAPNW to a state where the printer 10 does not belong to the initial SoftAPNW. In the present embodiment, since the printer 10 only has one MAC address (that is, a second MAC address) for a SoftAP, a state where both of the initial SoftAP and the alternative SoftAP are simultaneously active cannot be constructed. In addition, since the alternative SoftAP needs to be activated in a subsequent process, in T20, the printer 10 stops the initial SoftAP.

In T22, the printer 10 activates the alternative SoftAP using the alternative SoftAP setting information 40. Specifically, the printer 10 stores, in the parent station setting area 44, the alternative SoftAP setting information 40 included in the program 36. Accordingly, the operating state of the printer 10 shifts from the state where the printer 10 does not belong to the alternative SoftAPNW to a parent state where the printer 10 operates as a parent station of the alternative SoftAPNW.

Moreover, since the printer 10 has not activated the alternative SoftAP at the time of T16, even when a Probe Req. signal including the SSID "YYY" used in the alternative SoftAPNW is received, the printer 10 does not transmit a response signal to the Probe Req. signal (that is, a Probe Res. signal). Therefore, since the terminal apparatus 50 does not receive a response signal from the printer 10 even after a prescribed period of time lapses from the transmission of the Probe Req. signal in T16, in T24, the terminal apparatus 50 once again transmits the Probe Req. signal including the SSID "YYY" to the printer 10.

The printer 10 has activated the alternative SoftAP at the time of T24 or, that is, when the printer 10 once again receives the Probe Req. signal including the SSID "YYY" from the terminal apparatus 50. Therefore, in T26, the printer 10 transmits a Probe Res. signal including the SSID "YYY" to the terminal apparatus 50.

In T32, the terminal apparatus 50 sequentially transmits a Disassociation signal to the normal AP 100 using the normal APNW. Accordingly, the normal AP connection between the terminal apparatus 50 and the normal AP 100 is cut off. In the present embodiment, the terminal apparatus 50 is capable of establishing a wireless connection only with one apparatus. In addition, since the terminal apparatus 50 needs to establish a SoftAP connection with the printer 10 in a process to be described later, in T32, the terminal apparatus 50 cuts off the normal AP connection with the normal AP 100.

Subsequently, in T36, the printer 10 receives an Association Req. signal including the SSID "YYY" from the terminal apparatus 50 and, in T38, the printer 10 transmits an Association Res. signal including the SSID "YYY" to the terminal apparatus 50. In T40, the printer 10 performs communication of various signals (for example, a 4-way handshake) with the terminal apparatus 50 and establishes a SoftAP connection with the terminal apparatus 50. Accordingly, the printer 10 can form the alternative SoftAPNW to which both the printer 10 being a parent station and the terminal apparatus 50 being a child station belong.

In T42, using the alternative SoftAPNW, the printer 10 receives normal AP setting information 150 in a memory of the terminal apparatus 50 from the terminal apparatus 50. As described above, the normal AP setting information 150 is information currently being used in the normal APNW and includes the SSID "ZZZ", the password "CCC", and the like.

In T44, the printer 10 sets the normal AP setting information 150. Specifically, the printer 10 stores the normal AP setting information 150 in the normal AP setting area 46.

Subsequently, in T46 shown in FIG. 3, the printer 10 transmits a Probe Req. signal including the SSID "ZZZ" to the normal AP 100 and, in T48, the printer 10 receives a Probe Res. signal including the SSID "ZZZ" from the normal AP 100.

In T50, the printer 10 performs communication of various signals (Association Req./Res. signals, a 4-way handshake, and the like) with the normal AP 100 and establishes a normal AP connection with the normal AP 100. Accordingly, the printer 10 can join, as a child station, a normal APNW formed by the normal AP 100 being a parent station. In addition, the printer 10 can perform various communications with other apparatuses via the normal AP 100. For example, via the normal AP 100, the printer 10 can receive an image file representing an image from the other apparatuses and cause the print performing unit 16 to print the image.

In T52, the printer 10 transmits a setting result to the terminal apparatus 50 using the alternative SoftAPNW. In the present case, the setting result indicates that the setting of the normal AP setting information 150 at the printer 10 has been successful, that is, a normal AP connection between the printer 10 and the normal AP 100 has been successfully established. Supposing that a normal AP connection between the printer 10 and the normal AP 100 is not successfully established, a setting result indicating a failure is transmitted from the printer 10 to the terminal apparatus 50.

In a case where the terminal apparatus 50 receives a setting result from the printer 10 using the alternative SoftAPNW, the setting result is displayed in T54. The user can be informed that the setting of the normal AP setting information 150 at the printer 10 has been successful by viewing the setting result.

Subsequently, in T56, the printer 10 transmits a Deauthentication signal to the terminal apparatus 50 and, in T60, the printer 10 receives a Disassociation, signal from the terminal apparatus 50. Accordingly, the printer 10 cuts off the SoftAP connection with the terminal apparatus 50.

In T64, the printer 10 stops the alternative SoftAP. Specifically, the printer 10 erases the alternative SoftAP setting information 40 in the parent station setting area 44. Accordingly, the printer 10 causes the alternative SoftAPNW to disappear. The operating state of the printer 10 shifts from the parent state where the printer 10 operates as the parent station of the alternative SoftAPNW to the state where the printer 10 does not belong to the alternative SoftAPNW.

In T66, the terminal apparatus 50 performs communication of various signals to once again establish the normal AP connection with the normal AP 100 and joins the normal APNW as a child station. Accordingly, a state is created where the normal AP 100 being the parent station, the printer 10 being a child station, and the terminal, apparatus 50 being a child station all belong to the normal APNW. As a result, for example, the printer 10 can receive an image file from the terminal apparatus 50 via the normal AP 100 and perform printing.

Effect of First Embodiment

In the case where the printer 10 determines that the SSID "YYY" in the Probe Req. signal received from the terminal apparatus 50 matches the SSID "YYY" in the memory 34 (YES in T18), the printer 10 causes the operating state of the printer 10 to shift from the state where the printer 10 does not belong to the alternative SoftAPNW to the parent state of the alternative SoftAPNW (T22 shown in FIG. 2). Then, the printer 10 forms the alternative SoftAPNW to which both the printer 10 being a parent station and the terminal apparatus 50 being a child station belong (T36 to T40). On the other hand, in the case where the printer 10 determines that the SSID in the Probe Req. signal received from the terminal apparatus 50 does not match the SSID "YYY" in the memory 34 (NO in T18), the operating state of the printer 10 is maintained in the state where the printer 10 does not belong to the alternative SoftAPNW. That is, the printer 10 may not need to perform a process for stopping the initial SoftAP, a process for activating the alternative SoftAP, and the like. As a result, a processing load on the printer 10 can be prevented from increasing unnecessarily.

Furthermore, in the case where the printer 10 forms the alternative SoftAPNW, the printer 10 uses the alternative SoftAPNW to receive the normal AP setting information 150 from the terminal apparatus 50 (T42 shown in FIG. 2) and uses the normal AP setting information 150 to belong to the normal APNW (T46 to T50 shown in FIG. 3). Accordingly, the printer 10 can perform wireless communication via the normal AP 100 using the normal APNW.

In particular, the present embodiment adopts the specific configuration described above in which the initial SoftAP is activated when power of the printer 10 is turned on. A configuration of a comparative example may conceivably be adopted in which initial SoftAP setting information 38 instead of alternative SoftAP setting information 40 is registered in advance to the setting application 200. In this case, the terminal apparatus 50 can use the initial SoftAP setting information 38 to join, as a child station, the initial SoftAPNW in which the printer 10 operates as a parent station and, subsequently, use the initial SoftAPNW to transmit the normal AP setting information 150 to the printer 10. According to the configuration of the comparative example, the printer 10 may not need to stop the initial SoftAP and may not need not activate the alternative SoftAP. However, as described above, the initial SoftAPNW using the initial SoftAP setting information 38 uses an authentication scheme and a coding scheme having relatively low security levels. Therefore, in the initial SoftAPNW in which the initial SoftAP setting information 38 is used, security is difficult to be ensured and there is a risk that information may be leaked to a third party via other apparatuses participating in the initial SoftAPNW. Contrary to this, the present embodiment adopts a configuration in which an alternative SoftAP is activated using the alternative SoftAP setting information 40 instead of the initial SoftAP. In the alternative SoftAPNW using the alternative SoftAP, the alternative SoftAP setting information 40 including an authenticating scheme and a coding scheme having relatively high security levels may be used. That is, in the present embodiment, the printer 10 can use the alternative SoftAPNW with a higher security level than the initial SoftAPNW.

(Correspondence)

The printer 10, the terminal apparatus 50, and the normal AP 100 are, respectively, examples of a "communication apparatus", an "external apparatus", and a "specific access point". The alternative SoftAPNW, the initial SoftAPNW, and the normal APNW are, respectively, examples of a "first wireless network", "second wireless network", and a "specific wireless network". The SSID "YYY" is an example of a "specific character string", a "specific wireless identifier", and a "first wireless identifier". The normal AP setting information 150 and the alternative SoftAP are, respectively, examples of "specific wireless setting information" and an "access point function". The Probe Req. signal in T16, the Probe Req. signal in T24, and the Probe Res. signal in T26 shown in FIG. 2 are, respectively, examples of a "first specific signal", a "second specific signal", and a "response signal". A state of operation as the parent station of the alternative SoftAP, a state of operation as the child station of the alternative SoftAP, and a state of operation of the parent station of the initial SoftAP are, respectively, examples of a "first parent state", a "child state", and a "second parent state".

Second Embodiment

Differences from the first embodiment will be mainly described. In the present embodiment, the printer 10 shifts to a GM state in the WFD scheme instead of activating an alternative SoftAP.

The wireless I/F 20 further supports the WFD scheme in IEEE 802.11. The wireless 20 is able to use a second MAC address to shift to the 610 state in accordance with the WFD scheme and establish a wireless connection (hereinafter, referred to as a "WFD connection") with other apparatuses (for example, the terminal apparatus 50). Moreover, the terminal apparatus 50 also supports the WFD scheme. Therefore, the terminal apparatus 50 can join, as a child station (that is, a Client apparatus (hereinafter, referred to as a "CL apparatus")), a wireless network (hereinafter, referred to as a "WFDNW" (an abbreviation of a WED network)) in which the printer 10 operates as a parent station (that is, a G/O apparatus). Details of the WED scheme are described in "Wi-Fi Peer-to-Peer (P2P) Technical Specification Version 1.1" created by the Wi-Fi Alliance. Details of the WFD scheme are also disclosed in US Patent Application Publication No. 2013/0260683, the contents of which are hereby incorporated by reference into the present application. In addition, in the present embodiment, the alternative SoftAP setting information 40 includes an SSID "DIRECT-VVV" in place of the SSID "YYY".

The program 36 of the printer 10 includes WFD setting information 40 in place of the alternative SoftAP setting information 40. The WED setting information 40 includes the SSID "DIRECT-VVV", a password "BBB", and the like. In addition, the setting application 200 of the terminal apparatus 50 includes the WFD setting information 40 in place of the alternative SoftAP setting information 40.

Figure 4:
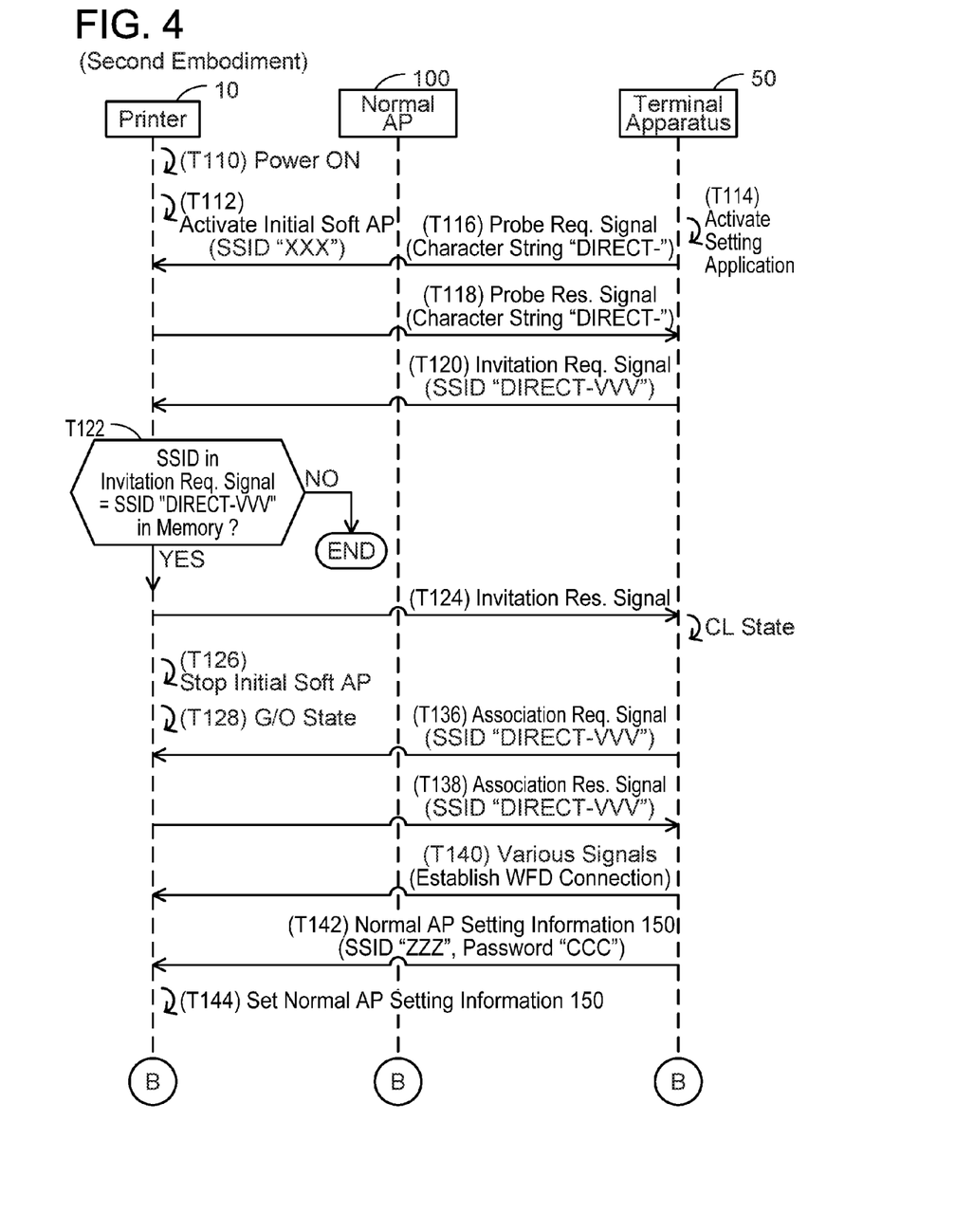
FIG. 4 is a sequence diagram of a second embodiment in which a printer operates as a G/O in accordance with the WFD scheme.
Figure 5:
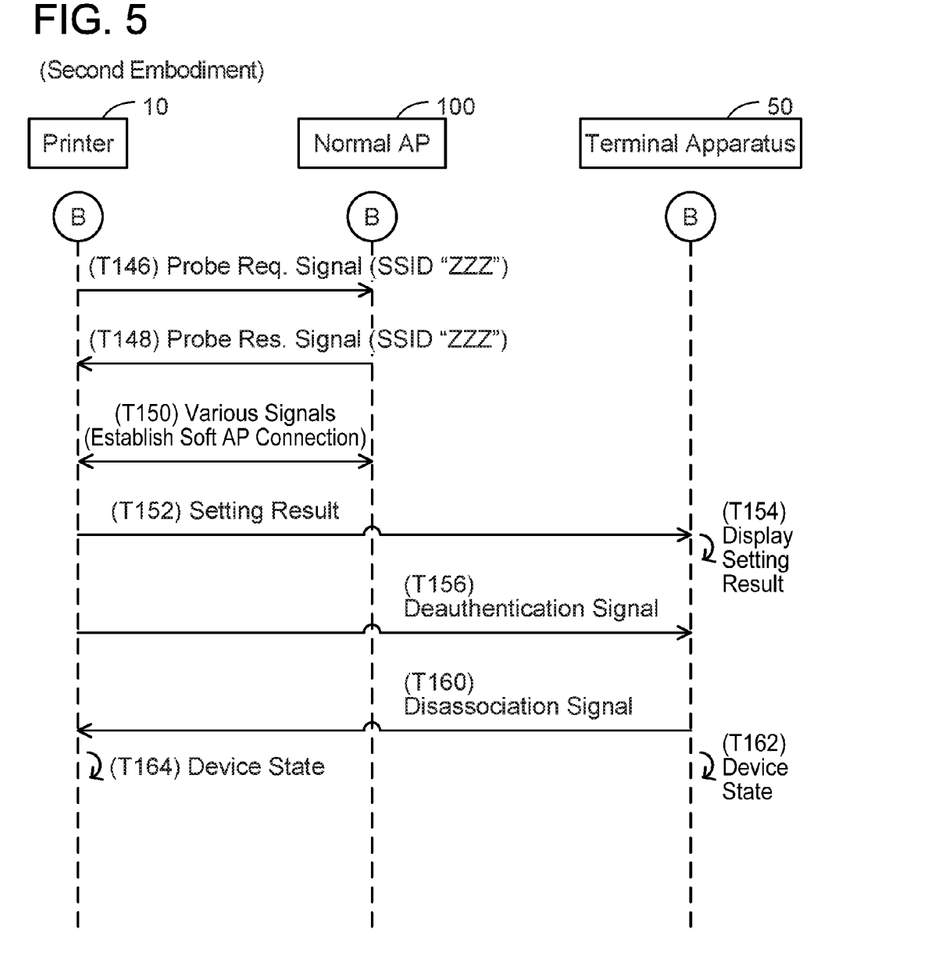
FIG. 5 is a sequence diagram that is a continuation of FIG. 4.

(Processes of Respective Devices 10, 50, 100, and the Like: FIGS. 4 and 5)

Next, contents of the respective processes performed by the printer 10 and the like will be described with reference to FIGS. 4 and 5. In an initial state shown in FIG. 4, the terminal apparatus 50 does not currently belong to the normal APNW. However, since the terminal apparatus 50 has previously belonged to the normal APNW, the terminal apparatus 50 stores the normal AP setting information 150.

T110 to 7114 are respectively similar to T10 to T14 shown in FIG. 2. In T116, the printer 10 receives a Probe Req. signal including a character string "DIRECT-" from the terminal apparatus 50. The character string "DIRECT-" is a character string indicating that the terminal apparatus 50 supports the WFD scheme. In addition, the Probe Req. signal including the character string "DIRECT-" is a signal for searching for other apparatuses that support the WFD scheme. As described above, the printer 10 supports the WFD scheme. Therefore, in T118, the printer 10 transmits a Probe Res. signal including the character string "DIRECT-s" to the terminal apparatus 50.

In T120, the terminal apparatus 50 reads out the SSID "DIRECT-VVV" included in the WFD setting information 40 in the setting application 200 and transmits an Invitation 40 Req. signal including the SSID "DIRECT-VVV" to the printer 10. The invitation Req. signal is a signal for requesting the printer 10 to form a WFDNW.

In a case where the printer 10 receives the Invitation Reg. signal including the SSID "DIRECT-VVV" from the terminal apparatus 50, in T122, the printer 10 determines whether or not the SSID "DIRECT-VVV" in the invitation Req. signal matches the SSID "DIRECT-VVV" included in the WFD setting information 40 in the memory 34. In a case where the SSID "DIRECT-VVV" in the Invitation Req. signal matches the SSID "DIRECT-VVV" in the memory 34 (YES in T122), the printer 10 proceeds to T124.

On the other hand, a case is assumed, where a state where, for example, the terminal apparatus 50 operates as a G/O apparatus and has formed a WFDNW. In the WFDNW, an SSID that differs from the SSID "DIRECT-VVV" is being used. In case where the user of the terminal apparatus 50 desires to have the printer 10 join the WFDNW, an operation for this purpose is performed on the terminal apparatus 50. In this case, the printer 10 may receive an invitation Req. signal that includes the different SSID. In such a state, the printer 10 determines that the SSID in the invitation Req. signal does not match the SSID "DIRECT-VVV" in the memory 34 (NO in T122) and ends the processing shown in FIG. 4 without performing the processes of T124 and thereafter. In this case, the operating state of the printer 10 is maintained in a state where the printer 10 does not belong to the WFDNW identified by the SSID "DIRECT-VVV".

In T124, the printer 10 transmits an Invitation Res. signal to the terminal apparatus 50. T126 is similar to T20 shown in FIG. 2. Next, in T128, the printer 10 causes the operating state of the printer 10 to shift from a device state (that is, a state in which the printer 10 does not belong to the WFDNW) to the G/O state. Specifically, the printer 10 stores the WFD setting information 40 included in the program 36 in the parent station setting area 44. Accordingly, the operating state of the printer 10 shifts from the state where the printer 10 does not belong to the WFDNW to a parent state where the printer 10 operates as a parent station of the WFDNW. T136 to T140 are similar to T36 to T40 shown in FIG. 2 with exception of the use of the SSID "DIRECT- VVV" and the establishment of a WFD connection instead of a SoftAP connection. Accordingly, the printer 10 can form the WFDNW to which both the printer 10 being a parent station (that is, a G/O apparatus) and the terminal apparatus 50 being a child station (that is, a CL apparatus) belong. T142 is similar to 142 shown in FIG. 2 with exception of the use of the WFDNW instead of the SoftAPNW. T144 is similar to T44 shown in FIG. 2.

T146 to T154 shown in FIG. 5 are respectively similar to 146 to T54 shown in FIG. 3. T156 to T160 are similar to T56 to T60 shown in FIG. 3 with exception of a WFD connection being cut off instead of a SoftAP connection being cut off. In T162, the terminal apparatus 50 causes the operating state of the terminal apparatus 50 to shift from a CL state to the device state. In T164, the printer 10 causes the operating state of the printer 10 to shift from the G/O state to the device state. Accordingly, the printer 10 causes the WFDNW to disappear.

Effect of Second Embodiment

In the present embodiment, in a case where it is determined that the SSID in the Invitation Req. signal received from the terminal apparatus 50 does not match the SSID "DIRECT-VVV" in the memory 34 (NO in T122 in FIG. 4), the operating state of the printer 10 is maintained in a state where the printer 10 does not belong to the WFDNW. That is, the printer 10 may not need to perform a process for stopping the initial SoftAP, a process for shifting to the G/O state, and the like. As a result, a processing load on the printer 10 can be prevented from increasing unnecessarily. In addition, in a case where the terminal apparatus 50 once again joins the normal APNW after the various processes shown in FIG. 5 end, the printer 10 can perform wireless communication with the terminal apparatus 50 via the normal AP 100 using the normal APNW.

(Correspondence)

The WFDNW is an example of a "first wireless network". The SSID "DIRECT-VVV" is an example of a "specific character string", a "specific wireless identifier", and a "first wireless identifier". The Invitation Req. signal in T120 shown in FIG. 4 is an example of a "first specific signal". The device state, the G/O state, and the CL state are, respectively, examples of a "first non-belonging state", a "first parent state", and a "child state".

Third Embodiment

Differences from the first embodiment will be mainly described. The terminal apparatus 50 supports a SoftAP function and is capable of activating a SoftAP using the alternative SoftAP setting information 40 in the setting application 200, establish a SoftAP connection with the printer 10, and form an alternative SoftAPNW to which both the terminal apparatus 50 being a parent station and the printer 10 being a child station belong. Both a MAC address for establishing a normal AP connection and a MAC address the establishing a SoftAP connection. are assigned to the terminal apparatus 50. Therefore, the terminal apparatus 50 is capable of simultaneously performing both wireless communication using the normal AP connection and wireless communication using the SoftAP connection.

The printer 10 can join the alternative SoftAPNW formed by the terminal apparatus 50 as a child station without activating an alternative SoftAP. The memory 34 of the printer 10 includes a child station setting area 45. The child station setting area 45 is an area in which, in a state where the printer 10 operates as the child station of the alternative SoftAPNW, the alternative SoftAP setting information 40 to be used in the alternative SoftAPNW is stored.

Figure 6:
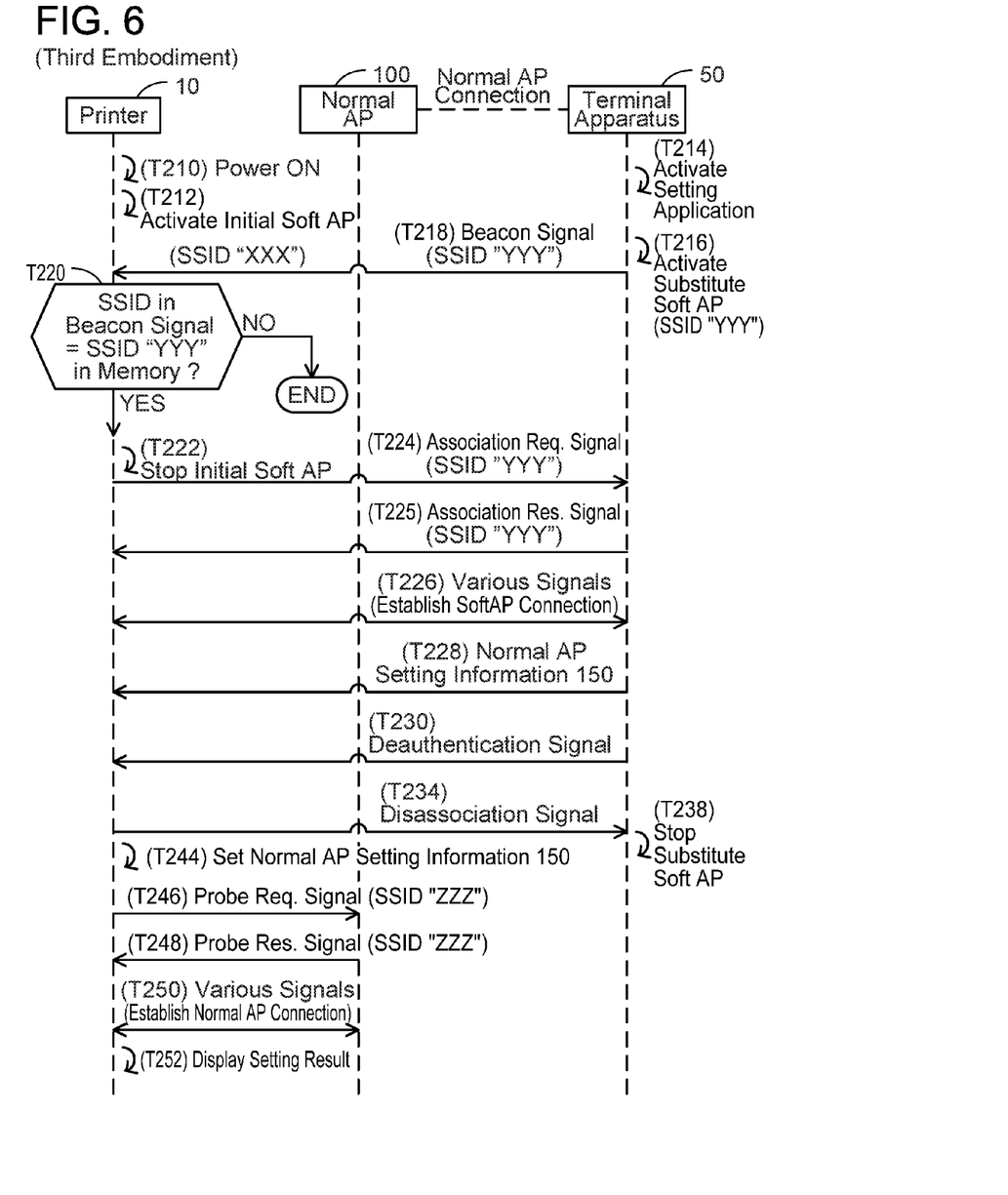
FIG. 6 is a sequence diagram of a third embodiment in which a printer operates as a child station.

(Processes of Respective Devices 10, 50, 100, and the Like; FIG. 6)

Next, contents of the respective processes performed by the printer 10 and the like will be described with reference to FIG. 6. An initial state in FIG. 6 is similar to the initial state shown in FIG. 2. T210 to T214 are respectively similar to T10 to T14 shown in FIG. 2.

In T216, the terminal apparatus 50 activates the alternative SoftAP using the alternative SoftAP setting information 40 in the setting application 200. Next, in T218, the terminal apparatus 50 reads out the SSID "YYY" included in the alternative SoftAP setting information 40 in the setting application 200 and transmits a Beacon signal including the SSID "YYY" to the printer 10. The Beacon signal is a signal for searching for apparatuses that should join the alternative SoftAPNW formed by the terminal apparatus 50.

In a case where the printer 10 receives the Beacon signal including the SSID "YYY" from the terminal apparatus 50, in T220, the printer 10 determines whether or not the SSID "YYY" in the Beacon signal matches the SSID "YYY" in the memory 34. In a case where the SSID "YYY" in the Beacon signal matches the SSID "YYY" in the memory 34 (YES in T220), the printer 10 proceeds to T222.

On the other hand, a situation will be assumed here where, for example, the terminal apparatus 50 has activated a SoftAP using another setting information in another application program instead of using the alternative SoftAP setting information 40 in the setting application 200. In this case, the terminal apparatus 50 transmits a Beacon signal including an SSID included in the other setting information (that is, an SSID other than "YYY"). Therefore, the printer 10 may receive the Beacon signal that includes the different SSID from the terminal apparatus 50. In such a state, the printer 10 determines that the SSID in the Beacon signal does not match the SSID "YYY" in the memory 34 (NO in T220) and ends the processing shown in FIG. 6 without performing the processes of T222 and thereafter. In this case, the operating state of the printer 10 is maintained in the state where the printer 10 does not belong to the alternative SoftAPNW identified by the SSID "YYY".

T222 is similar to T20 shown in FIG. 2. Moreover, in a modification, the printer 10 may maintain a state where an initial SoftAP is active without performing T222. Subsequently, in T224, the printer 10 transmits an Association Req. signal including the SSID "YYY" to the terminal apparatus 50 and, in T225, the printer 10 receives an Association Res. signal including the SSID "YYY" from, the terminal apparatus 50. In T226, the printer 10 performs communication of various signals (for example, a 4-way handshake) with the terminal apparatus 50 and establishes a SoftAP connection with the terminal apparatus 50. At this occasion, the printer 10 stores the alternative SoftAP setting information 40 in the child station, setting area 48. Accordingly, the operating state of the printer 10 shifts from the state where the printer 10 does not belong to the alternative SoftAPNW to a child state where the printer 10 operates as a child station of the alternative SoftAPNW. As a result, the printer 10 can form the alternative SoftAPNW to which both the printer 10 being a child station and the terminal apparatus 50 being a parent station belong.

T228 is similar to T42 shown in FIG. 2. In T230, the printer 10 receives a Deauthentication signal from the terminal apparatus 50 and, in T234, the printer 10 transmits a Disassociation, signal to the terminal apparatus 50. In T238, the terminal apparatus 50 stops the alternative SoftAP. Accordingly, the terminal apparatus 50 causes the alternative SoftAPNW to disappear.

T244 to T250 are respectively similar to T44 shown in FIG. 2 to T50 shown in FIG. 3. In T248, the printer 10 displays a setting result indicating that the setting of the normal AP setting information 150 has been successful on the display unit 14.

Effect of Third Embodiment

According to the present embodiment, in the case where it is determined that the SSID in the Beacon signal received from the terminal apparatus 50 does not match the SSID "YYY" in the memory 34 (NO in T220), the operating state of the printer 10 is maintained in the state where the printer 10 does not belong to the alternative SoftAPNW. That is, the printer 10 may not need to perform a process for stopping the initial SoftAP, a process for establishing the SoftAP connection of T224 to T226, and the like. As a result, a processing load on the printer 10 can be prevented from increasing unnecessarily. Further, the printer 10 can perform wireless communication via the normal AP 100 using a normal APNW. Moreover, in the present embodiment, the Beacon signal in T218 shown in FIG. 6 is an example of a "first specific signal".

(First modification) In the first to third embodiments described above, the printer 10 may not receive the normal AP setting information 150 from the terminal apparatus 50 and may not establish a normal AP connection with the normal AP 100 using an alternative SoftAPNW or a WFDNW. In this case, the printer 10 may receive an image file representing an image from the terminal apparatus 50 using an alternative SoftAPNW or a WFDNW and perform printing of the image. That is, a "communication apparatus" may not perform "receiving specific wireless setting information from the external apparatus" and "belonging to the specific wireless network by using the specific wireless setting information".

(Second modification) While the printer 10 stops the alternative SoftAP (T64 shown in FIG. 3) in the first embodiment described above, the printer 10 may maintain the state where the alternative SoftAP is active. In this case, the printer 10 can maintain a state where communication with the terminal apparatus 50 can be performed using the alternative SoftAPNW. That is, a "communication apparatus" may not perform "causing the first wireless network to disappear".

(Third modification) In the first to third embodiments described above, the printer 10 may not activate an initial SoftAP when power is turned on. That is, a "communication apparatus" may not perform "causing the operating state of the communication apparatus to shift from a second non-belonging state to a second parent state".

(Fourth modification) In the third embodiment described above, the following process may be performed in place of T216 to T220 shown in FIG. 6. After activating the setting application 200 in T214, the user further performs a predetermined operation on the printer 10. In this case, the printer 10 transmits a Probe Req. signal that does not include an SSID to the terminal apparatus 50. The terminal apparatus 50 activates an alternative SoftAP in a case where the terminal apparatus 50 receives the Probe Req. signal that does not include an SSID from the printer 10. Subsequently, the printer 10 once again transmits the Probe Req. signal that does not include an SSID to the terminal apparatus 50 and receives a Probe Res. signal including the SSID "YYY" from the terminal apparatus 50. The printer 10 determines whether or not the SSID in the Probe Res. signal matches the SSID "YYY" in the memory 34. In a case where the SSID in the Probe Res. signal matches the SSID "YYY" in the memory 34, the printer 10 proceeds to T222. In the present modification, the Probe Res. signal is an example of a "first specific signal".

(Fifth modification) In the second embodiment described above, in T120 shown in FIG. 4, the printer 10 may receive a G/O Negotiation Req. signal including the SSID "DIRECT-VVV" from the terminal apparatus 50 instead of an Invitation Req. signal. In T122, the printer 10 may determine whether or not the SSID in the G/O Negotiation Req. signal matches the SSID "DIRECT-VVV" in the memory 34. In a case where the SSID in the G/O Negotiation Req. signal matches the SSID "DIRECT-VVV" in the memory 34 (YES in T122), in T124, the printer 10 transmits a G/O Negotiation Res. signal to the terminal apparatus 50 instead of an Invitation Res. signal. In T128, as a result of the G/O Negotiation, the printer 10 may shift to a G/O state or to a CL state. In the present modification, the G/O Negotiation Req. signal is an example of a "first specific signal".

(Sixth modification) The "communication apparatus" is not limited to a printer and may be, for example, a scanner or a PC. That is, the "communication apparatus" includes all apparatuses capable of communicating with other apparatuses.

(Seventh embodiment) In the respective embodiments described above, the respective processes shown in FIGS. 2 to 6 are realized by the CPU 32 of the printer 10 executing a program that is, software). Alternatively, at least one of the respective processes may be realized by hardware such as a logic circuit.

What is claimed is:
1. A communication apparatus comprising:
a processor; and
a memory storing a specific character string and computer-readable instructions therein, the computer-readable instructions, when executed by the processor, causing the communication apparatus to perform:
receiving a first specific signal including a specific wireless identifier from an external apparatus;
determining whether the specific wireless identifier in the first specific signal is a first wireless identifier including the specific character string in the memory, the first wireless identifier being for identifying a first wireless network;
in a case where it is determined that the specific wireless identifier is the first wireless identifier, shifting an operating state of the communication apparatus from a first non-belonging state in which the communication apparatus does not belong to the first wireless network to a first parent state in which the communication apparatus operates as a parent station of the first wireless network; and
forming the first wireless network to which both the communization apparatus being the parent station and the external apparatus being a child station belong after the operating state of the communication apparatus is shifted to the first parent state,
wherein in a case where it is determined that the specific wireless identifier is not the first wireless identifier, the communication apparatus is maintained in the first non-belonging state.
2. The communication apparatus as in claim 1, wherein the computer-readable instructions, when executed by the processor, cause the communication apparatus to further perform:

receiving specific wireless setting information from the external apparatus by using the first wireless network in a case where the first wireless network is formed, the specific wireless setting information being currently used in a specific wireless network formed by a specific access point, the external apparatus satisfying either one condition of currently belonging to the specific wireless network and having previously belonged to the specific wireless network; and belonging to the specific wireless network by using the specific wireless setting information in a case where the specific wireless setting information is received from the external apparatus.

3. The communication apparatus as in claim 2, wherein the computer-readable instructions, when executed by the processor, cause the communication apparatus to further perform:

causing the first wireless network to disappear after the specific wireless setting information is received from the external apparatus.

4. The communication apparatus as in claim 1, wherein a response signal is not sent to the external apparatus in response to receiving the first specific signal, and the computer-readable instructions, when executed by the processor, cause the communication apparatus to further perform:

sending a response signal to the external apparatus in response to receiving a second specific signal from the external apparatus after the first specific signal has been received.

5. The communication apparatus as in claim 1, wherein the first specific signal is a Probe Request signal, and the operating state of the communication apparatus is shifted from the first non-belonging state to the first parent state by being shifted from a state in which an access point function is not active to a state in which the access point function is active, the access point function being a function by which the communication apparatus operates as an access point of the first wireless network.

6. The communication apparatus as in claim 1, wherein the first specific signal is an invitation Request signal in accordance with Wi-Fi Direct (registered trademark) scheme, and the operating state of the communication apparatus is shined from the first non-belonging state to the first parent state by being shifted from a device state in accordance with the Wi-Fi Direct scheme to a Group Owner state in accordance with the Wi-Fi Direct scheme.

7. The communication apparatus as in claim 1, wherein the computer-readable instructions, when executed by the processor, cause the communication apparatus to further perform:

causing the operating state of the communication apparatus to shift from a second non-belonging state in which the communication apparatus does not belong to a second wireless network to a second parent state in which the communication apparatus operates as a parent station of the second wireless network, when power of the communication apparatus is turned on, the second wireless network being identified by a specific second wireless identifier, wherein the first specific signal is received from the external apparatus while the operating state of the communication apparatus is the second parent state, and the computer-readable instructions, when executed by the processor, cause the communication apparatus to further perform:

causing the operating state of the communication apparatus shift from the second parent state to the second non-belonging state in a case where it is determined that the specific wireless identifier is the first wireless identifier.

8. A communication apparatus comprising:

a processor; and a memory storing a specific character string and computer-readable instructions therein, the computer-readable instructions, when executed by the processor, causing the communication apparatus to perform:

receiving a first specific signal including a specific wireless identifier from an external apparatus;

determining whether the specific wireless identifier in the first specific signal is a first wireless identifier including the specific character string in the memory, the first wireless identifier being for identifying a first wireless network;

in a case where it is determined that the specific wireless identifier is the first wireless identifier, shifting an operating state of the communication apparatus from a first non-belonging state in which the communication apparatus does not belong to the first wireless network to one state of a first parent state in which the communication apparatus operates as a parent station of the first wireless network and a child state in which the communication apparatus operates as a child station of the first wireless network;

forming the first wireless network to which both the communication apparatus being the parent station or the child station and the external apparatus being the child station or the parent station belong after the operating state of the communication apparatus is shifted to either of the first parent state or the child state, wherein in a case where it is determined that the specific wireless identifier is not the first wireless identifier, the communication apparatus is maintained in the first non-belonging state;

receiving specific wireless setting information from the external apparatus by using the first wireless network in a case where the first wireless network is formed, the specific wireless setting information being currently used in a specific wireless network formed by a specific access point, the external apparatus satisfying either one condition of currently belonging to the specific wireless network and having previously belonged to the specific wireless network; and belonging to the specific wireless network by using the specific wireless setting information in a case where the specific wireless setting information is received from the external apparatus.

9. The communication apparatus as in claim 8, wherein in the case where it is determined that the specific wireless identifier is the first wireless identifier, the operating state of the communication apparatus is shifted from the first non-belonging state to the child state, and the first wireless network to which both the communication apparatus being the child station and the external apparatus being the parent station belong is formed.

10. The communication apparatus as in claim 9, wherein the first specific signal is a Beacon signal sent from the external apparatus in which an access point function is active, the access point function being a function by which the external apparatus operates as an access point of the first wireless network.

11. The communication apparatus as in claim 8, wherein the computer-readable instructions, when executed by the processor, cause the communication apparatus to further perform causing the first wireless network to disappear after the specific wireless setting information is received from the external apparatus.

12. The communication apparatus as in claim 8, wherein the computer-readable instructions, when executed by the processor, cause the communication apparatus to further perform causing the operating state of the communication apparatus to shift from a second non-belonging state in which the communication apparatus does not belong to a second wireless network to a second parent state in which the communication apparatus operates as a parent station of the second wireless network, when power of the communication apparatus is turned on, the second wireless network being identified by a specific second wireless identifier, wherein the first specific signal is received from the external apparatus while the operating state of the communication apparatus is the second parent state, and the computer-readable instructions, when executed by the processor, cause the communication apparatus to further perform:

causing the operating state of the communication apparatus to shift from the second parent state to the second non-belonging state in a case where it is determined that the specific wireless identifier is the first wireless identifier.

13. A non-transitory computer-readable storage medium storing computer-readable instructions for a communication apparatus, wherein the computer-readable instructions, when executed by a processor of the communication apparatus, cause the communication apparatus to perform:

receiving a first specific signal including a specific wireless identifier from an external apparatus;

determining whether the specific wireless identifier in the first specific signal is a first wireless identifier including a specific character string, the first wireless identifier being for identifying a first wireless network;

in a case where it is determined that the specific wireless identifier is the first wireless identifier, shifting an operating state of the communication apparatus from a first non-belonging state in which the communication apparatus does not belong to the first wireless network to a first parent state in which the communication apparatus operates as a parent station of the first wireless network; and forming the first wireless network to which both the communication apparatus being the parent station and the external apparatus being a child station belong after the operating state of the communication apparatus is shifted to the first parent state, wherein in a case where it is determined that the specific wireless identifier is not the first wireless identifier, the communication apparatus is maintained in the first non-belonging state.

14. A non-transitory computer-readable storage medium storing computer-readable instructions for a communication apparatus, wherein the computer-readable instructions, when executed by a processor of the communication apparatus, cause the communication apparatus to perform:

receiving a first specific signal including a specific wireless identifier from an external apparatus;

determining whether the specific wireless identifier in the first specific signal is a first wireless identifier including a specific character string, the first wireless identifier being for identifying a first wireless network;

in a case where it is determined that the specific wireless identifier is the first wireless identifier, shifting an operating state of the communication apparatus from a first non-belonging state in which the communication apparatus does not belong to the first wireless network to one state of a first parent state in which the communication apparatus operates as a parent station of the first wireless network and a child state in which the communication apparatus operates as a child station of the first wireless network;

forming the first wireless network to which both the communication apparatus being the parent station or the child station and the external apparatus being the child station or the parent station belong after the operating state of the communication apparatus is shifted to either of the first parent state or the child state, wherein in a case where it is determined that the specific wireless identifier is not the first wireless identifier, the communication apparatus is maintained in the first non-belonging state;

receiving specific wireless setting information from the external apparatus by using the first wireless network in a case where the first wireless network is formed, the specific wireless setting information being currently used in a specific wireless network formed by a specific access point, the external apparatus satisfying either one condition of currently belonging to the specific wireless network and having previously belonged to the specific wireless network; and belonging to the specific wireless network by using the specific wireless setting information in a case where the specific wireless setting information is received from the external apparatus.

* * * * *

UNITED STATES PATENT AND TRADEMARK OFFICE
CERTIFICATE OF CORRECTION

PATENT NO. : 9,942,759 B2
APPLICATION NO. : 15/198612
DATED : April 10, 2018
INVENTOR(S) : Hiroshi Shibata Page 1 of 1

It is certified that error appears in the above-identified patent and that said Letters Patent is hereby corrected as shown below:

In Column 14, Claim 1, Line 59:
Please delete "communization" and insert --communication--

In Column 15, Claim 2, Lines 2-3:
Please delete "to farther perform:" and insert --to further perform:--

In Column 15, Claim 6, Line 46:
Please delete "invitation" and insert --Invitation--

In Column 15, Claim 6, Line 50:
Please delete "shined" and insert --shifted--

In Column 16, Claim 7, Line 9:
Please delete "shift from" and insert --to shift from--

Signed and Sealed this
Thirty-first Day of July, 2018

Andrei Iancu
*Director of the United States Patent and Trademark Office*